US009001060B2

(12) United States Patent
Harris

(10) Patent No.: US 9,001,060 B2
(45) Date of Patent: Apr. 7, 2015

(54) TOUCH SENSITIVE DEVICE

(75) Inventor: Neil John Harris, Cambourne (GB)

(73) Assignee: New Transducers Limited, Cambridgeshire (GB)

( * ) Notice: Subject to any disclaimer, the term of this patent is extended or adjusted under 35 U.S.C. 154(b) by 386 days.

(21) Appl. No.: 13/498,744

(22) PCT Filed: Oct. 1, 2010

(86) PCT No.: PCT/GB2010/051640
§ 371 (c)(1),
(2), (4) Date: Apr. 17, 2012

(87) PCT Pub. No.: WO2011/039545
PCT Pub. Date: Apr. 7, 2011

(65) Prior Publication Data
US 2012/0200520 A1 Aug. 9, 2012

(30) Foreign Application Priority Data
Oct. 2, 2009 (GB) .................. 0917284.2

(51) Int. Cl.
*G06F 3/041* (2006.01)
*G06F 3/02* (2006.01)
(Continued)

(52) U.S. Cl.
CPC ............... *G06F 3/041* (2013.01); *G06F 3/016* (2013.01); *G06F 3/04886* (2013.01)

(58) Field of Classification Search
CPC .................. G06F 2203/013; G06F 2203/014; G06F 2203/015
USPC .................. 345/168–178; 178/18.01–18.06; 340/407.1–407.2; 341/27; 200/520, 200/521
See application file for complete search history.

(56) References Cited

U.S. PATENT DOCUMENTS 7,346,172 B1 * 3/2008 Begault ............................ 381/56
2002/0075135 A1 * 6/2002 Bown ........................ 340/384.1
(Continued)

FOREIGN PATENT DOCUMENTS

| JP | 2006-79135 A | 3/2006 |
| JP | 2008-225690 A | 9/2008 |
| WO | 2009074826 | 6/2009 |

OTHER PUBLICATIONS

I. Poupyrev et al., Ambient Touch: Designing Tactile Interfaces for Handheld Devices, Proceedings of the 15th Annual ACM Symposium on User Interface Software and Technology, Oct. 27, 2002, pp. 51-60, vol. CONF. 15, ACM, New York, N. Y., U.S.
(Continued)

*Primary Examiner* — Lun-Yi Lao
*Assistant Examiner* — Jarurat Suteerawongsa
(74) *Attorney, Agent, or Firm* — Alan I. Cantor; Roylance, Abrams, Berdo & Goodman LLP

(57) ABSTRACT

A method of generating a keyboard switch haptic sensation in a coupled system comprising a touch-sensitive surface and a force exciter or actuator coupled to the touch-sensitive surface, the method comprising generating a carrier wave signal at frequencies within the frequency bandwidth of the coupled system, modulating the carrier wave signal with a modulation envelope so that the modulated carrier wave signal has a closely spaced pair of peaks, and driving the exciter or actuator with the modulated carrier wave signal to excite the touch-sensitive surface to provide a closely spaced pair of impulses whereby the keyboard switch haptic sensation is simulated to a user touching the touch-sensitive surface.

23 Claims, 8 Drawing Sheets

(51) Int. Cl.
*G06F 3/043* (2006.01)
*G06F 3/045* (2006.01)
*G06F 3/044* (2006.01)
*G06F 3/046* (2006.01)
*G08B 6/00* (2006.01)
*H01H 13/14* (2006.01)
*G06F 3/01* (2006.01)
*G06F 3/0488* (2013.01)

(56) References Cited

U.S. PATENT DOCUMENTS

| | | | |
|---|---|---|---|
| 2005/0248549 A1 | 11/2005 | Dietz et al. | |
| 2007/0285216 A1* | 12/2007 | Tierling et al. | 340/407.1 |
| 2008/0055277 A1* | 3/2008 | Takenaka et al. | 345/177 |
| 2008/0100177 A1* | 5/2008 | Dai et al. | 310/317 |
| 2008/0170037 A1* | 7/2008 | Cruz-Hernandez et al. | 345/161 |
| 2008/0216578 A1 | 9/2008 | Takashima et al. | |
| 2011/0267294 A1* | 11/2011 | Kildal | 345/173 |

OTHER PUBLICATIONS

I. Poupyrev et al., Tactile Interfaces for Small Touch Screens, Proceedings of the 16th Annual ACM Symposium on User Interface Software and Technology, Jan 1, 2003, pp. 217-220, ACM Press, New York, N.Y., U.S.

E. Hoggan et al., Investigating the Effectiveness of Tactile Feedback for Mobile Touchscreens, Online Conference Proceedings of the 26th Annual CHI Conference on Human Factors in Computing Systems, Apr. 5, 2008 (Retrieved from the Internet on Apr. 27, 2008), pp. 1573-1582, ACM, Florence, Italy.

K. Tashiro et al., Realization of Button Click Feeling by Use of Ultrasonic Vibration and Force Feedback, Proceedings of the 3rd Joint Eurohaptics Conference and Symposium on Haptic Interfaces for Virtual Environment and Teleoperator Systems, Mar. 18, 2009, entire document.

May 7, 2014 Office Action in counterpart Japanese Application No. 2012-531502; English translation of the Japanese Office Action.

* cited by examiner

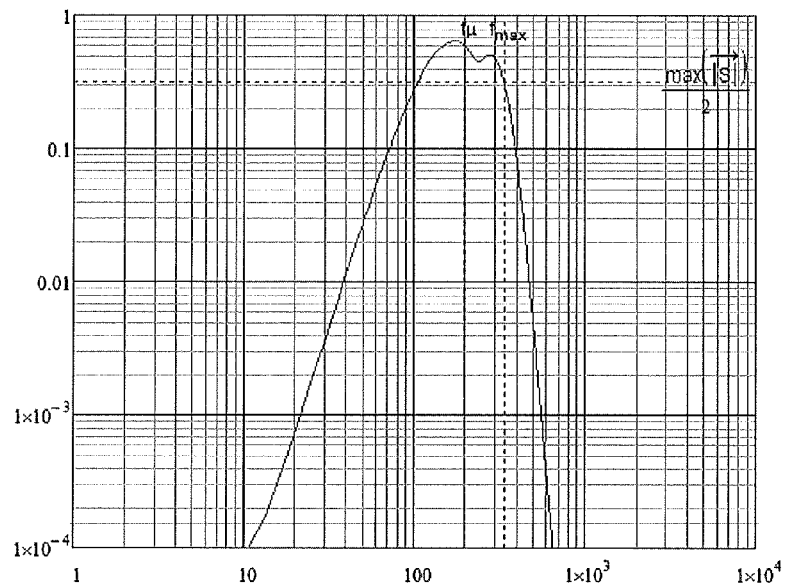
Fig 9b
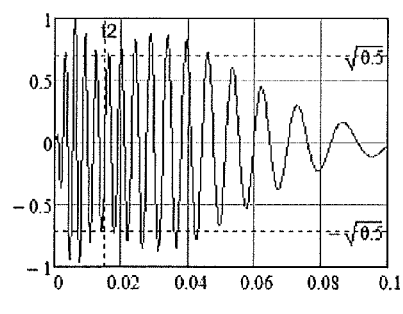 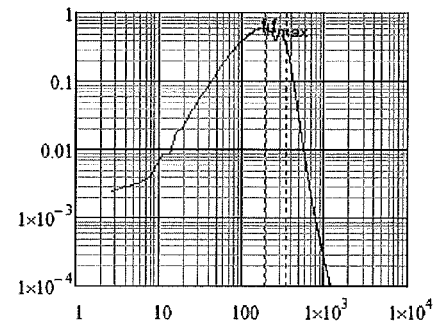
Fig 10a  Fig 10b

TOUCH SENSITIVE DEVICE

TECHNICAL FIELD

The invention relates to touch sensitive devices including touch sensitive screens or panels.

BACKGROUND ART

U.S. Pat. No. 4,885,565, U.S. Pat. No. 5,638,060, U.S. Pat. No. 5,977,867, US2002/0075135 describe touch-operated apparatus having tactile feedback for a user when touched. In U.S. Pat. No. 4,885,565 an actuator is provided for imparting motion to the CRT when the actuator is energised to provide tactile feedback. In U.S. Pat. No. 5,638,060, a voltage is applied to a piezo-electric element which forms a switch to vibrate the element to apply a reaction force to a user's finger. In U.S. Pat. No. 5,977,867, a tactile feedback unit generates a mechanical vibration sensed by the user when the touch screen is touched with a finger or a pointer. The amplitude, vibration frequency and pulse length of the mechanical vibration are controlled, with the pulse width being long enough to be felt but short enough to terminate before the next key touch. US2002/0075135 describes the use of a second transducer to provide a pulse in the form of transient spike to simulate a button click.

In each of the prior art documents described above, tactile feedback is provided in response to a discrete touch, of a user's finger or pointer.

DISCLOSURE OF INVENTION

According to the invention, there is provided a method of generating a keyboard switch haptic sensation in a coupled system comprising a touch-sensitive surface and a force exciter or actuator coupled to the touch-sensitive surface, the method comprising
generating a carrier wave signal at frequencies within the frequency bandwidth of the coupled system,
modulating the carrier wave signal with a modulation envelope so that the modulated carrier wave signal has a closely spaced pair of peaks, and
driving the exciter or actuator with the modulated carrier wave signal to excite the touch-sensitive surface to provide a closely spaced pair of pulses whereby the keyboard switch haptic sensation is simulated to a user touching the touch-sensitive surface.

According to another aspect of the invention, there is provided a touch sensitive device comprising a touch-sensitive surface,
a force exciter coupled to the touch-sensitive surface to excite vibration in the surface in response to a signal sent to the exciter, with the touch-sensitive surface and exciter together forming a coupled system and
a signal generator to generate the signal, with the signal generator generating a carrier wave signal at frequencies within the frequency bandwidth of the coupled system and modulating the carrier wave signal with a modulation envelope so that the modulated carrier wave signal has a closely spaced pair of peaks whereby a user touching the touch-sensitive surface excited by the exciter in response to the modulated carrier wave signal experiences the keyboard switch haptic sensation.

According to another aspect of the invention, there is provided that in a coupled system comprising a touch-sensitive surface and a force exciter or actuator coupled to the touch-sensitive surface, a method comprises
generating a signal at frequencies within the frequency bandwidth of the coupled system,
driving the exciter or actuator with the signal to excite the touch-sensitive surface to radiate an audible signal and to simulate a haptic sensation in response to a user touching the touch-sensitive surface.

The signal may have both an audio component and a low frequency component for simulating the haptic sensation.

The above aspects may be combined with each other and any of the following features may apply to all aspects.

The pair of pulses have peaks spaced apart by a time interval of the order of 10 to 40 ms, 15 to 30 ms, or 22 to 26 ms. The second peak in the pair of peaks may have a width of between three to four times the width of the first peak.

The modulation envelope may comprise a sum of two exponential functions having different decay rates so that the modulated carrier wave signal has the closely spaced pair of peaks. Both exponential functions are a function of a factor n which is dependent on the ratio r between the different decay rates whereby the decay of each exponential function is increased to ensure that the pair of peaks appear. Each exponential function may be a function of the same factor n or two different factors $n_1$ and $n_2$. In particular, a critical value of the or each factor (n or $n_1$ and $n_2$) at which the modulated carrier wave signal has the closely spaced pair of peaks may be determined and the value n is preferably set to be above this critical value.

A second value of the or each factor (n or $n_1$ and $n_2$) may also be determined at which the modulated carrier wave signal has a closely spaced pair of peaks with a local minimum between the peaks to be above a determined amount and setting the value n to be above this second value. The modulation envelope may be defined as:

$$f(\alpha \cdot t, n_1 \cdot n_2) = (\alpha \cdot t)^{n_1} e^{(n_1 \cdot (1-\alpha \cdot t))} + \left(\frac{\alpha}{r} \cdot t\right)^{n_2} e^{(n_2 \cdot (1-\frac{\alpha}{r} \cdot t))}$$

where $\alpha$ and $\alpha/r$ are the decay rates of each exponential function, t is time, $n_1$ and $n_2$ are the factors dependent on r ($n_1$ may equal $n_2$).

The critical value of n may be calculated by determining the value at which the first and second derivatives of the function $f$ are zero at the same point.

The exciter may be driven with an audio signal synchronous in time with the haptic signal. The audio signal may have an acoustic signature having a substantially $1/3^{rd}$ octave bandwidth. The audio signal may have a frequency substantially in the range 800 Hz to 4 HKz. The audio signal may be localised on the touch sensitive surface to the region touched by the user. The audio signal may be steered using linear amplitude panning and/or may be simultaneously steered to different regions of the touch sensitive surface. Audio signals from a plurality of force exciters or actuators may be steered.

The modulated carrier wave signal may have a duration in the region of 100 ms. The carrier wave signal may be a sine wave at a single frequency. Alternatively, the carrier wave signal may comprise multiple sine waves covering a range of frequencies or may be a swept (FM modulated) sine wave or a band-limited noise signal.

The generated carrier wave signal may contain information at frequencies which are harmonically related to the frequencies in the signal which generates the desired haptic sensation whereby the haptic sensation is improved. This follows the well known psychoacoustic phenomenon called pitch recognition, in which reconstruction of the fundamental from harmonic series allows the perception of frequencies that are actually absent.

The vibration may include any type of vibration, including bending wave vibration, more specifically resonant bending wave vibration.

The vibration exciter may comprise means for applying a bending wave vibration to the screen face. The vibration exciter may be electro-mechanical. The exciter may provide a frequency bandwidth for the coupled system in the region of 100 Hz to 400 Hz. The actuator may have a high Bl or force factor. BL may have a value greater than 3 or greater than 5. Bl is defined in a standard electromagnetic exciter as the product of magnet field strength in the voice coil gap and the length of wire in the magnetic field, in tesla-meters (T·m).

The exciter may be an electromagnetic exciter and may have a frequency bandwidth for the coupled system of 150 Hz to 300 Hz. Such exciters are well known in the art e.g. from WO97/09859, WO98/34320 and WO99/13684, belonging to the applicant and incorporated herein by reference. Alternatively, the exciter may be a piezoelectric transducer, a magneto-strictive exciter or a bender or torsional transducer (e.g. of the type taught in WO 00/13464). The piezoelectric transducer may have a frequency bandwidth for the coupled system with a lower limit in the region of 100 Hz to 350 Hz. The exciter may be a distributed mode actuator, as described in WO01/54450, incorporated herein by reference and may have a frequency bandwidth for the coupled system of 150 Hz to 350 Hz. A plurality of exciters (perhaps of different types) may be selected to operate in a co-ordinated fashion. The or each exciter may be inertial.

The touch surface may be a panel-form member which is a bending wave device, for example, a resonant bending wave device. The touch screen may also be a loudspeaker wherein a second vibration exciter excites vibration which produces an acoustic output. For example, the touch screen may be a resonant bending wave mode loudspeaker as described in International Patent Application WO97/09842 which is incorporated by reference.

Contact on the surface may be detected and/or tracked as described in International patent applications WO 01/48684, WO 03/005292 and/or WO 04/053781 to the present applicant. These International patent applications are hereincorporated by reference. Alternatively, other known methods may be used to receive and record or sense such contacts.

The invention further provides processor control code to implement the above-described methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

BRIEF DESCRIPTION OF DRAWINGS

The invention is diagrammatically illustrated, by way of example, in the accompanying drawings in which:

FIG. 1b is a block diagram of the system for use with the touch sensitive screen of FIG. 1a;

FIG. 9b shows the spectra for the signal of FIG. 9a calculated by FFT;

FIG. 10a plots the variation in time of a sample haptic signal using r=5.8; p=5, q=13;

FIG. 10b shows the spectra for the signal of FIG. 10a calculated by FFT;

DETAILED DESCRIPTION OF DRAWINGS

Figure 1A:
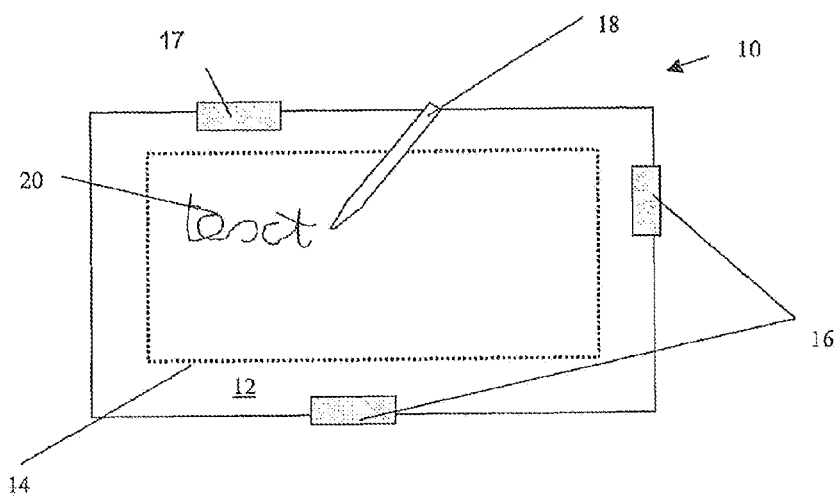
FIG. 1a is a plan view of a touch sensitive screen.

FIG. 1a shows a touch sensitive device 10 comprising a touch sensitive screen 12 on which a stylus 18 or pencil or similar writing instrument is being used to write text 20. Alternatively, the screen may be contacted by a user's finger (not shown). One or more sensors 17 are used to detect a touch or movement on the screen and one or more exciters 16 are provided to generate a signal within the screen.

Figure 1B:
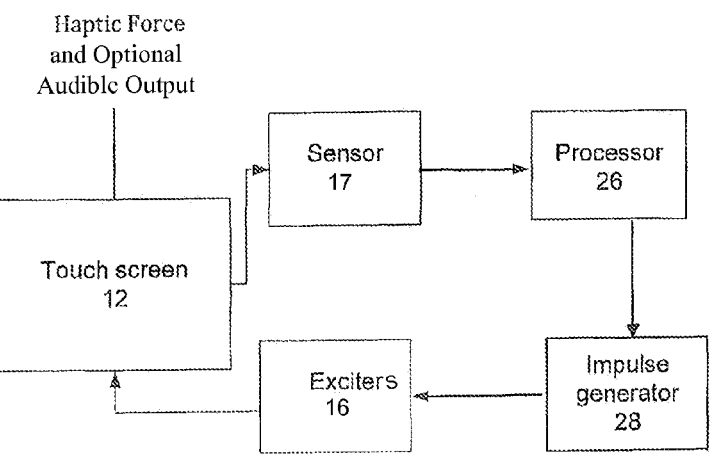

FIG. 1b shows how the touch sensitive device 10 may be adapted to use haptic methods and mechanical feedback technology to create touch-related feedback to a user. The screen surface is mechanically energised by the exciter in response to a user's touch. As shown in FIG. 1b, the touch sensitive screen 12 is connected to a sensor 17 which detects the nature of the contact from the stylus. The sensor is connected to a processor 26 which processes the signals from the sensor which instructs the impulse generator 28 to generate a signal which generates vibration in the touch screen which is transmitted as a haptic signal to a user.

Figure 2A:
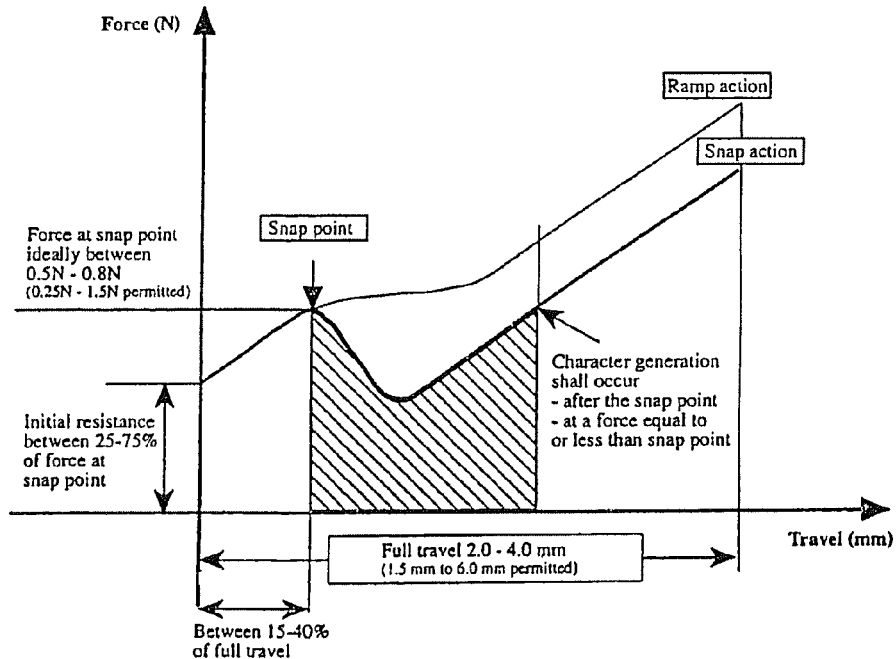
FIG. 2a is an illustration of the relationship between key force and key displacement as specified in ISO/DIS 9241/4.2 standard.

There is an ISO ergonomics standard for the F-X characteristic of a keyboard switch. It is shown in FIG. 2a, and is taken from "Measurement of impedance characteristics of computer keyboard keys", Proceedings of the 7th Mediterranean Conference on Control and Automation (MED99) Haifa, Israel—Jun. 28-30, 1999. The key feature of this response is the shaded "negative impedance" region.

Figure 2B:
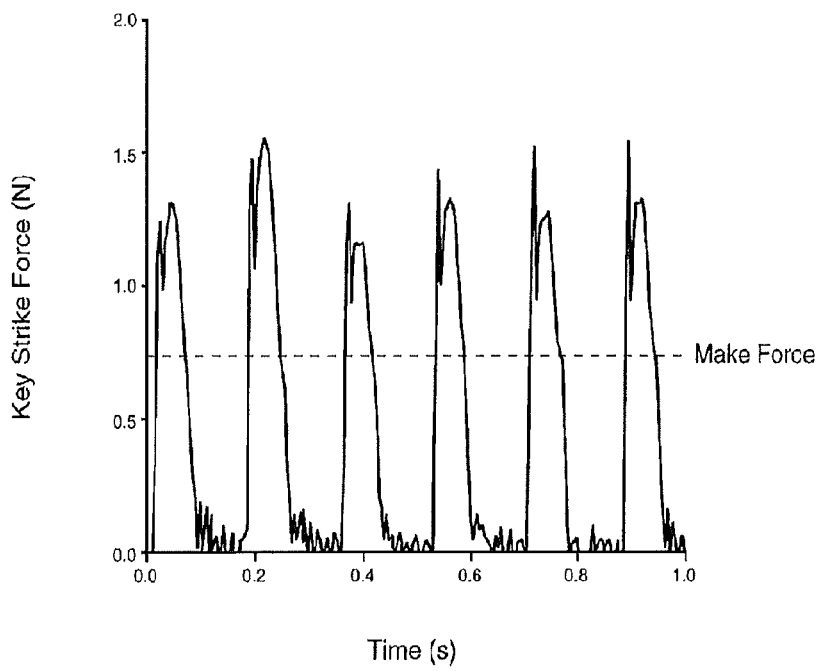
FIG. 2b is a graph plotting key strike force (N) against time (s) for a representative key strike force record.

As described in Robert G Radwin and Barry A Ruffalo, "Computer key switch force-displacement characteristics and short-term effects on localized fatigue", ERGONOMICS, 1999, VOL. 42, NO. 1, 160-170, Electromyography (EMG) is used to evaluate and record the activation signal of muscles due to constant index finger exertion used for key tapping. The RMS amplitude of the EMG for a representative key strike force record is shown in FIG. 2b Again, a key feature is the double peak FIG. 2b shows that the response is not identical from key-press to key-press. Another paper by Mark Nagurka and Richard Marklin, "Measurement of Stiffness and Damping Characteristics of Computer Keyboard Keys", Journal of Dynamic Systems, Measurement, and Control—JUNE 2005, Vol. 127, 283-288, shows that the detail also changes with which key is pressed, and the speed of typing. Despite the variability, there are common features which can be modelled, namely:

1) Two peaks~22-26 ms apart
2) Second peak width~3 to 4 times first peak width
3) Total width at trough depth~44 ms+/−6 ms.
4) Make force~½; width~54 ms+/−2 ms.
5) Delay to 2nd peak 2-3 times delay to first
6) Delay~width for first peak~10-15 ms
7) Signal duration is about 100 ms A haptic signal which produces a simulation of a click is $$h(t) = \alpha t e^{1-\alpha t} \cos\left(\frac{\omega c t}{1+\beta t} - \frac{\omega c}{\alpha + \beta}\right), \quad (1)$$

where $h(t)$ is the product of $g(t)$—the envelope function and $fm(t)$—a frequency modulating function.
where $g(t) = \alpha \cdot t \cdot e^{1-\alpha \cdot t}$, which has a maximum value of unity at time $t = 1/\alpha$,
$\alpha$ is a decay rate of the envelope
$\beta$ is a parameter controlling the rate of frequency modulation, and
$\omega c$ is the angular frequency at time $t=0$.

Merely adding together two clicks of reasonably different $\alpha$ of the form given in equation (1), there is no dip in the response, as the decay is not fast enough. A variation to the envelope function with a faster decay rate is given below.

$$h(\alpha \cdot t, n) = (\alpha \cdot t)^n \cdot \exp(n \cdot (1 - \alpha \cdot t)) \quad (2)$$

where n is a constant and
$\alpha$ is the decay rate of the envelope

Figure 3:
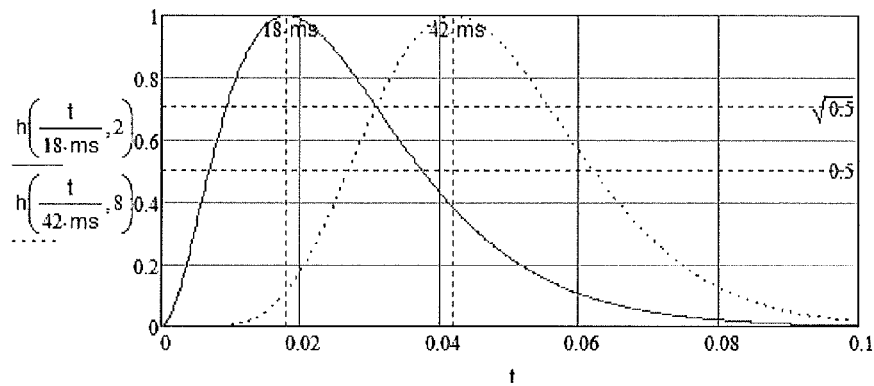
FIG. 3 plots the variation over time of two modified envelope functions h.

This function has a maximum value of 1 when t is $1/\alpha$. As scaling $\alpha$ and t in a reciprocal manner produces no change in shape, the envelope may be considered as a function of the product ($\alpha \cdot t$) and of n. Note that n need not be an integer. Two examples of this variant envelope function are shown FIG. 3 having values of $\alpha = 1/18$ ms and n=2 and $\alpha = 1/42$ ms and n=8, respectively Some of the properties of this function are explored in relation to FIGS. 12a and 12b, but the only one to note for now is the Laplace transform, which gives us the spectrum.

$$h(t) \Rightarrow h(s), H(s) = H(0) \cdot \left(\frac{1}{\frac{s}{n \cdot \alpha} + 1}\right)^{n+1}, H(0) = \frac{1}{\alpha} \cdot \frac{\Gamma(n+1)}{n^{n+1}} \quad (3)$$

Equation 3 shows that the function spectrum is low pass of order n+1.

On its own, the function of equation 2 does not provide the two peaks we need. The applicant has recognised that by adding two functions of this type together, where only $\alpha$ is changed, provided n is above some critical value, a composite envelope function $f$ which produces the required two peaks are obtained. n could also change, but it adds a lot of extra complexity for little gain.

$$f(\alpha \cdot t, n, r) = h(\alpha \cdot t, n) + h\left(\frac{\alpha}{r} \cdot t, n\right) \quad (4)$$

$$F(s) = F(0) \cdot \frac{H(s) + r \cdot H(r \cdot s)}{1+r}, F(0) = (1+r) \cdot H(0) \quad (5)$$

Figure 4:
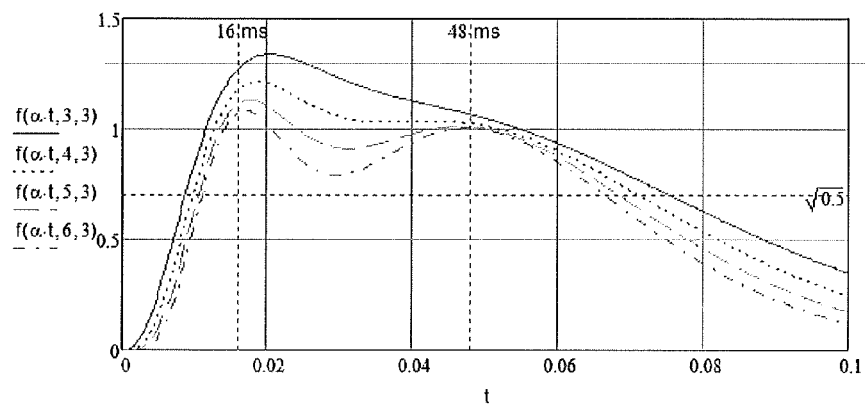
FIG. 4 plots the variation over time of four composite envelope functions f.

FIG. 4 plots four variations of the composite envelope function with $\alpha = 1/16$ ms, r=3 and n having integer values between 3 and 6. As shown, the dip between the first and second peak in the composite function is more clearly visible as the value of n increases. The critical value of n for which the curve "just" has a second peak depends only r. Similarly, the value of n which gives a 3 dB dip between peaks may be defined as a function of r.

The value n_crit(r) is the value which cases the first and second derivatives of f to vanish at the same point. The value n_3 dB(r) is the value which cause the local minimum between the peaks to be 3 dB below the first peak.

$$n_{crit}(r) \approx 1.046 - 4.674 \cdot r^{-1} + 3.956 \cdot r^{-2}, \quad (6)$$

$$\frac{n_{3dB}}{n_{crit}}(r) \approx 1.536 + 0.377 \cdot r^{-1} - 0.244 \cdot r^{-2}$$

Figure 5:
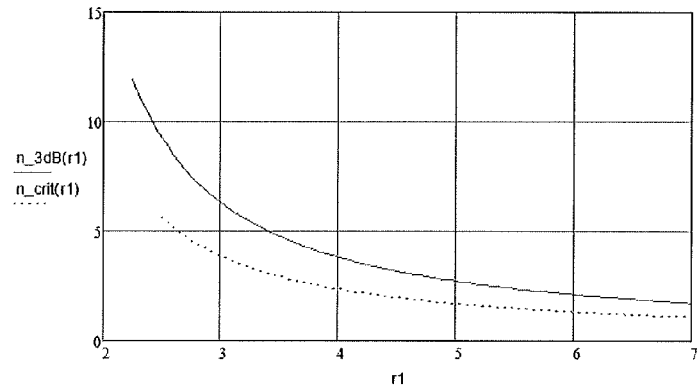
FIG. 5 shows the relationship between two variations of a key variable (n) in the envelope function f against another key variable (r) in the envelope function f.
Figure 6:
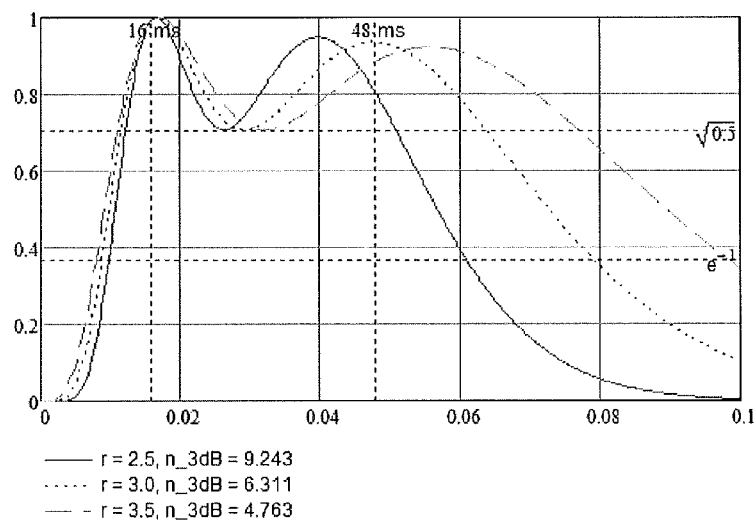
FIG. 6 plots the variation over time of three composite envelope functions f.

The variation of these values with r is plotted in FIG. 5. As r decreases towards 2, the values of n_crit(r) and n_3 dB(r) begin to increase asymptotically. FIG. 6 shows three variations in the composite envelope function $f$ with r=2.5, n_3 dB=9.2; r=3, n_3 dB=6.3 and r=3.5, n_3 dB=4.7, respectively. The function with r=3 has a first peak at 16 ms and a second peak at 48 ms. The other two functions also have first peaks at approximately 16 s. However despite the variation in n_3 dB, the function with a lower value of r has a second peak earlier than 48 ms and the function with a higher value of r has a second peak after 48 ms.

It is desirable to specify ranges of r and $\alpha$ (and n, but we assume that n=n_3 dB(r)) that produce a signal to match the target spectra. One way of achieving this is to define 5 key time points, $\alpha t0$ through $\alpha t4$. These are respectively the normalised times for first crossing of −3 dB, first peak, dip, second peak and final crossing of −3 dB. The target criteria may then be translated into relationships between these values, as set out in the following tables.

TABLE 1

Summary of design parameter options

| Ref. | Target | Relationship | Implication |
|---|---|---|---|
| 1 | Two peaks ~ 22-26 ms apart | 22 ms ≤ t3 − t1 ≤ 26 ms | α depends on r |
| 2 | Second peak width ~ 3 to 4 times first peak width | $3 \leq \frac{\alpha t4 - \alpha t2}{\alpha t2 - \alpha t0} \leq 4$ | r >> 7 |
| 3 | Width at −3 dB ~ 44 ms +/− 6 ms | 42 ms ≤ t4 − t0 ≤ 50 ms | α depends on r |
| 4 | Width at 0.5 ~ 54 ms +/− 2 ms. | Similar to 1 | α depends on r |
| 5 | Delay to second peak 2-3 times delay to first | $2 \leq \frac{\alpha t3}{\alpha t1} \leq 3$ | r ≤ 3.2 |
| 6 | Delay ≈ width peak 1 ~ 10-15 ms | $\frac{\alpha t1}{2 \cdot \alpha t0} \approx \frac{\alpha t2 - \alpha t0}{\alpha t1} \approx 1$ | 2.9 ≤ r ≤ 6.2 |
| 7 | Signal duration is about 100 ms | f(100 ms) < 0.1 | r < 6.2 |

TABLE 2

Summary of design parameter options

| r | n = n_3 dB(r) | Range of 1/α for (1) | Range of 1/α for (3) | Range of 1/α for (4) |
|---|---|---|---|---|
| 3.2 | 5.588 | 11.3 ms to 12.3 ms | 11.7 ms to 13.9 ms | 11.9 ms to 12.9 ms |
| 4.5 | 3.183 | 6.5 ms to 7.7 ms | 7.1 ms to 7.7 ms | 7.2 ms to 8.5 ms |
| 5.8 | 2.220 | 4.7 ms to 5.6 ms | 4.9 ms to 5.3 ms | 5.2 ms to 6.1 ms |

TABLE 3

Summary of selected design parameters and resulting key times

| r | n = n_3dB(r) | 1/α | Half-width | αt3/αt1 | (αt2 − αt0)/αt1 | αt1/2αt0 | (αt4 − αt2)/(αt2 − αt0) |
|---|---|---|---|---|---|---|---|
| 3.2 | 5.588 | 11.80 ms | 8.4 ms | 12.5 ms | 22.4 ms | 37.5 ms | 50.8 ms |
| 4.5 | 3.183 | 7.40 ms | 4.7 ms | 8.1 ms | 17.5 ms | 33.1 ms | 48.1 ms |
| 5.8 | 2.220 | 5.38 ms | 3.1 ms | 6.1 ms | 15.1 ms | 31.1 ms | 47.1 ms |

TABLE 4

Summary of performance against design criteria (all satisfy (1) and (7).

| r | n | t4 − t0 | Half-width | αt3/αt1 | (αt2 − αt0)/αt1 | αt1/2αt0 | (αt4 − αt2)/(αt2 − αt0) |
|---|---|---|---|---|---|---|---|
| 3.2 | 5.588 | 42.4 ms | 51.4 ms | 3.000 | 1.112 | 0.746 | 2.025 |
| 4.5 | 3.183 | 43.3 ms | 54.2 ms | 4.08 | 1.571 | 0.860 | 2.403 |
| 5.8 | 2.220 | 44.0 ms | 56.7 ms | 5.113 | 1.968 | 0.969 | 2.668 |

Figure 7:
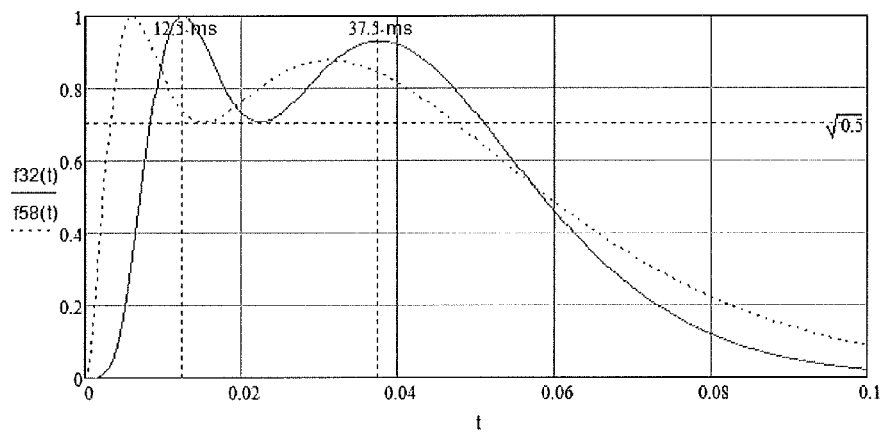
FIG. 7 plots the variation over time of two composite envelope functions f with a reasonable match to the criteria specified.

FIG. 7 shows two functions that are a reasonable match for the specified criteria. They both have two peaks spaced by approximately 25 ms. The functions represent the range available if the key ratios are to be reasonably met. Changing a allows a simple scaling in time whilst preserving these ratios. The only way to combine the attributes of the two curves would be to use different n for the two pulses, but that adds complexity that is probably unnecessary. Of the two curves, the first has a faster decay (making truncation at 100 ms easier) and a slower rise-time (faster HF roll-off).

Figure 8:
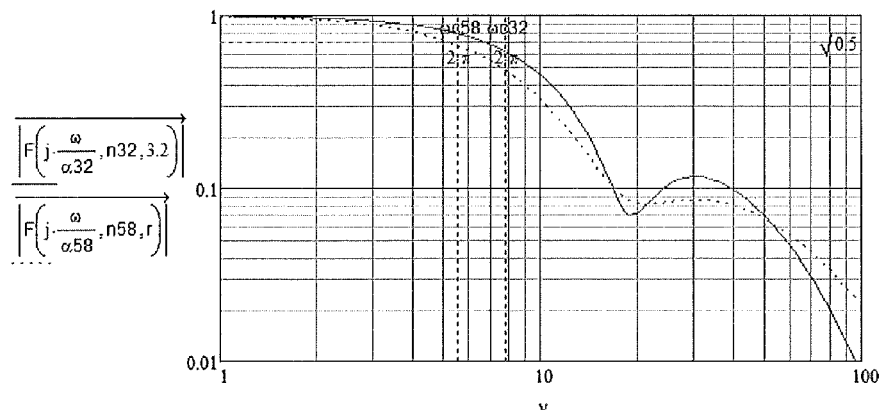
FIG. 8 illustrates the spectra of candidate double pulses, scaled to F(0)=1, against υ in Hz.

These functions define the envelope of the haptic signal, and may be considered as baseband signals. They have very low frequency content, each having cut-off frequencies below 10 Hz. The spectra of the two signals are shown in FIG. 8. For use in any haptics hardware with limited low-frequency response, the signals would have to be modulated by a suitable carrier, i.e. modulated by cos ($\omega_0 \cdot t$) shown in detail below for the "single bump" function. Clearly, this is applicable also to the "double bump" function.

$$hm(\alpha, \omega_0, t, n) = (\alpha \cdot t)^n \cdot \exp(n \cdot (1 - \alpha \cdot t)) \cdot \cos(\omega_0 \cdot t)$$

$$(\alpha \cdot t)^n \cdot \exp(n \cdot (1 - \alpha \cdot t)) \cdot \exp(j \cdot \omega \cdot t) \Rightarrow H(j \cdot (\omega - \omega_0), n)$$

(approximate spectrum)

$$hm(\alpha, \omega_0, t, n) \Rightarrow \frac{1}{2} \cdot (H(j \cdot (\omega - \omega_0), n) + H(j \cdot (\omega + \omega_0), n))$$

(exact spectrum)

From the approximate spectrum, the centre frequency is clearly $\omega_0$, and the cut-off frequencies are $\omega_0 \pm \omega_c$, where $\omega_c$ is defined below in the discussion on FIG. 12b.

It would be possible to use a single-frequency carrier, but the use of frequency modulation (FM) may also be useful. From psychoacoustic considerations, and because of the exponential function in the envelope, it makes some sense to use an exponentially swept carrier, and informal trials suggest a downward sweep is better than an upward sweep. It also seems sensible to set the phase reference at the signal peak, t1. Hence:

$$\omega(t) = \omega_0 \cdot \exp(-\beta \cdot t) \qquad (7)$$

$$\phi(t) = \int_{t1}^{t} \omega(\tau) d\tau = \frac{\omega_0}{\beta} \cdot (\exp(-\beta \cdot t1) - \exp(-\beta \cdot t)), \qquad (8)$$

$$g(t) = \cos(\phi(t))$$

Where g(t) is the frequency modulating function, and
β is a parameter controlling the rate of frequency modulation, It may also be specified that g(t) peaks at t3 and passes through zero at t2, for example.

In this case, the values of the two parameters are constrained as follows $$\frac{\omega_0}{\beta} \cdot (\exp(-\beta \cdot t1) - \exp(-\beta \cdot t2)) = \left(p + \frac{1}{2}\right) \cdot \pi, \; p \in \text{integer} \qquad (9)$$

$$\frac{\omega_0}{\beta} \cdot (\exp(-\beta \cdot t1) - \exp(-\beta \cdot t3)) = q \cdot \pi, \; q \in \text{integer} \qquad (10)$$

Figure 9A:
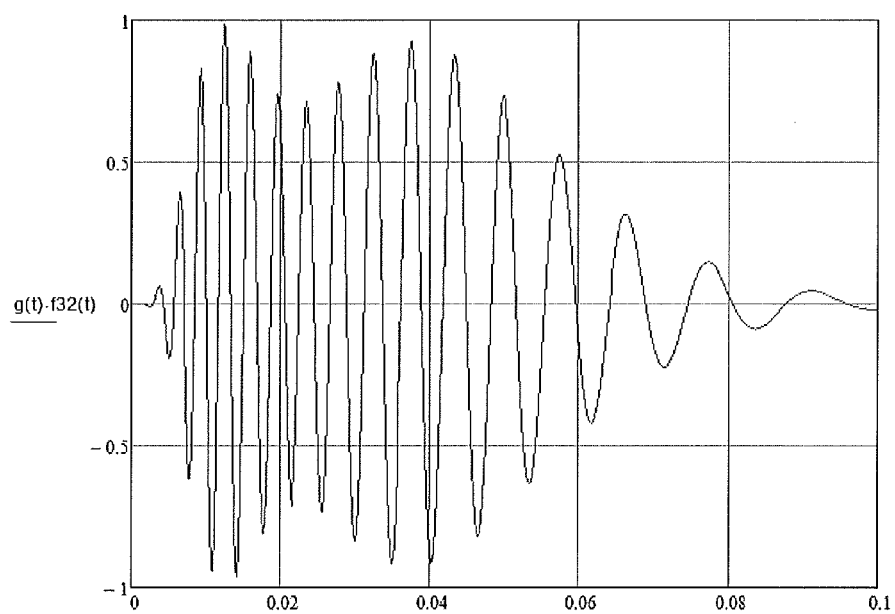
FIG. 9a plots the variation in time of a sample haptic signal using r=3.2, p=5, q=12.

The integer values, p and q, thus set the frequency range of the sweep. It is then possible to solve (9)/(10) for f3 then solve (10) for $\omega_0$. FIG. 9a shows a full signal based on the £32 envelope of FIG. 7, and using p=5, q=12. The values of $\omega_0$ and β are 2492.2 and 20.537, respectively.

It would be useful to characterise the sweep by additional dependent parameters, $\omega_\mu$ and $\omega_{max}$, the mean and maximum frequencies. The latter is easily defined as ω(t0), and we could also define $\omega_{min}$ as ω(t4). The former need a little consideration. Because the signal extent is effectively infinite, the simple arithmetic mean always equals zero. If we calculate the weighted mean, where the weighting function is just the modulation envelope, we get a useful answer. The integration is known, as it is effectively the same as the Laplace transform, i.e., $$E(\omega^m) = \frac{\int_0^\infty \omega(t)^m \cdot h(t)}{\int_0^\infty h(t)} = \omega_0 \cdot \frac{H(s = m \cdot B)}{H(0)} = \omega_0 \cdot \left(\frac{1}{\frac{m \cdot \beta}{n \cdot \alpha} + 1}\right)^{n+1} \qquad (11)$$

so $\omega_\mu = E(\omega)$, $\omega_\sigma = \sqrt{(E(\omega^2) - E(\omega)^2)}$ are the mean and standard deviation.

For the signal above, the frequency parameters are summarised as in table 5. The spectrum is shown in FIG. 9b. A modulated f58 signal engineered to have very similar $\omega_\mu$ and $\omega_{max}$ is seen in FIGS. 10a and 10b, where the slower HF roll-off is clearly evident.

TABLE 5

Summary of frequency parameters for specimen signal.

| $\omega_0$ | β | $\omega_\mu$ | $\omega_\sigma$ | $\omega_{min}$ | $\omega_{max}$ | unit |
|---|---|---|---|---|---|---|
| 2492.2 | 20.537 | 1225.0 | 471.0 | 877.9 | 2098.4 | rad/s |
| 396.7 | 3.27 | 199.7 | 74.96 | 139.7 | 334.0 | Hz |

Thus, signals which model real switch force characteristics and the associated neural responses are described. Whilst these are unlikely to be the only suitable signals for simulating keyboard switches, they have been developed using a sound philosophical basis. In particular, it has proved useful that the envelope function and the modulation are considered separately—the former being motivated by the ergonomics, and the latter by the mechanics of the target system.

There have been many studies which show that acoustic feedback can enhance subjective and objective task performance when using touch interfaces. Further, when different cues are combined to give multi-modal feedback (such as tactile+audio+visual) the improvement is magnified significantly (e.g. M. Ercan Altinsoy and Sebastian Merchal (TU Dresden), "Audiotactile Feedback Design for Touch Screens", HAID'09 and Ju-Hwan Lee, Ellen Poliakoff, Charles Spence (Oxford, Manchester), "The effect of Multimodal Feedback Presented via a Touch Screen on the Performance of Older Adults", HAID'09).

The coupling of the modalities is strong, and the presence of sound can alter what people feel, for example as described in http://www.newscientist.com/article/mg20126997.900-tactile-illusions-7-parchment-skin.html and http://www.boingboing.net/2009/03/17/tactile-illusions.html. Using audio metaphors is another useful trick. For example, a key press may use a falling tone on push and a rising tone on release—people do not need training, but understand immediately what is happening.

It is extremely important that the different feedbacks are synchronous in both time and space. In his opening keynote presentation at HAID'09, Professor Charles Spence (is the head of the Crossmodal Research Laboratory based at the Department of Experimental Psychology, Oxford University) reported the results of experiments which demonstrated that the average just noticeable difference (JND) in arrival times for audio and haptic were 7 ms if audio came first, or 12 ms if haptics came first.

Thus acoustic signatures may be appropriate for keyboard switch simulation, in addition to the signals identified above.

Experiments have shown that the presence of an audio cue at the correct time and place is more important than the detail of the cue's acoustic signature. That said, it the subjective assessment of quality may be affected quite strongly.

A German researcher, Alexander Treiber (see Http://iaf.hs-heilbronn.de/wiki/AlexanderTreiber) has done much research on the acoustics and psycho-acoustics of rotary switches. He reports that high-quality switches have a strong audio component at around 2 kHz, and that adding this audio cue to continuous rotary encoders creates the illusion of discrete switching—users report feeling the clicks, even though no haptic feedback was used. The frequency also affects the subjective assessment of switch quality—too low, and the switch sounds cheap and plastic; too high and it sounds tinny.

There does not appear to be any similar research into the sound of computer keyboards, except for example a paper by Dmitri Asonov and Rakesh Agrawal (IBM Almaden Research Center), "Keyboard Acoustic Emanations", Proceedings of the IEEE Symposium on Security and Privacy (2004), pp. 3-11 which describes how the slightly different sounds of each key may be used to eavesdrop on what is being typed. Their acoustic signature is essentially a $\frac{1}{3}^{rd}$ octave bandwidth from about 3.5 kHz to 4 kHz. This seems about right for older keyboards, but a little high for the more modern keyboards, where 2-3 kHz seems better.

Informal testing has shown that the $\frac{1}{3}^{rd}$ octave bandwidth is almost exactly right (this should be expected from a psycho-acoustical perspective, as it matches the critical bandwidth of the human hearing system). A wider bandwidth sounds too transient and a narrower bandwidth sounds too tonal. The tests also showed that any frequency from just over 800 Hz up to 4 kHz works, and the choice of the "best" frequency will probably be very subjective.

As set out above, a "click" may be simulated using a "single bump" function modulated by a simple sinusoid. More information on the definition and the spectrum of this signal may be found in below in relation to FIG. 12a but is defined as the function hm below.

$$hm = (\alpha, \omega_0, t, n) = (\alpha \cdot t)^n \cdot \exp(n \cdot (1 - \alpha \cdot t)) \cdot \cos(\omega_0 \cdot t)$$

$$(\alpha \cdot t)^n \cdot \exp(n \cdot (1 - \alpha \cdot t)) \cdot \exp(j \cdot \omega \cdot t) \Rightarrow H(j \cdot (\omega - \omega_0), n)$$

(approximate spectrum)

$$hm(\alpha, \omega_0, t, n) \Rightarrow \frac{1}{2} \cdot (H(j \cdot (\omega - \omega_0), n) + H(j \cdot (\omega + \omega_0), n))$$

(exact spectrum)

The sinusoid may also be phase-shifted so that its phase reference is coincident with the peak of the envelope. This would have little effect on the spectrum (a linear combination of (3) and (6)), other than a phase shift.

$$hm = (\alpha, \omega_0, t, n) = (\alpha \cdot t)^n \cdot \exp(n \cdot (1 - \alpha \cdot t)) \cdot \sin(\omega_0 \cdot t)$$

$$(\alpha \cdot t)^n \cdot \exp(n \cdot (1 - \alpha \cdot t)) \cdot \exp(j \cdot \omega \cdot t) \Rightarrow -j \cdot H(j \cdot (\omega - \omega_0), n)$$

(approximate spectrum)

$$hm(\alpha, \omega_0, t, n) \Rightarrow \frac{1}{2j} \cdot (H(j \cdot (\omega - \omega_0), n) - H(j \cdot (\omega + \omega_0), n))$$

(exact spectrum)

The question, then, is what values of α and n are appropriate? Referring to table 3 above, the theoretical switching point should be t2. Informal testing revealed that this sounds just too late, and that using t1 is noticeably better. The fact that t1 and t2 differ by only 10 ms highlights the importance of low-latency between the haptic and audio cues.

Given a choice of centre frequency and a bandwidth of ⅓$^{rd}$ octave, it is possible to design a click of either function hm defined above directly. In practice, the values of n required are very high, so it is better to add a pure delay corresponding to t0 from the table.

$$hm(\alpha, \omega_0, t, n) = (\alpha \cdot (t - t0) \cdot \exp(1 - \alpha \cdot (t - t0)))^n \cdot \cos(\omega_0 \cdot (t - t1)),$$

$$t \geq t0 \text{ where}$$

$$\frac{1}{\alpha} = t1 - t0 = \frac{1}{\omega_0} \cdot \left(16 \cdot n \cdot \sqrt{2^{\frac{1}{n+1}} - 1}\right)$$

$$n \approx \frac{1}{\ln(2)} \cdot \left(\frac{\omega_0 \cdot (t1 - t0)}{16}\right)^2$$

Subjectively, the sound changes very little with increasing n. The change from n=1 to n=1.5 is perceptible, a subsequent change to n=2 only just so, and beyond that essentially imperceptible.

Figure 11A:
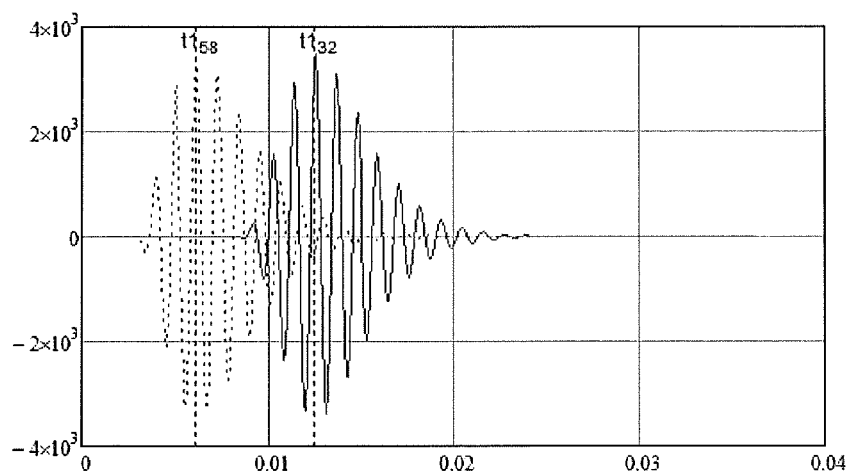
FIG. 11a is an illustration showing the variation in amplitude with time of two tone bursts with a fundamental frequency of 880 Hz (musical note A2)
Figure 11B:
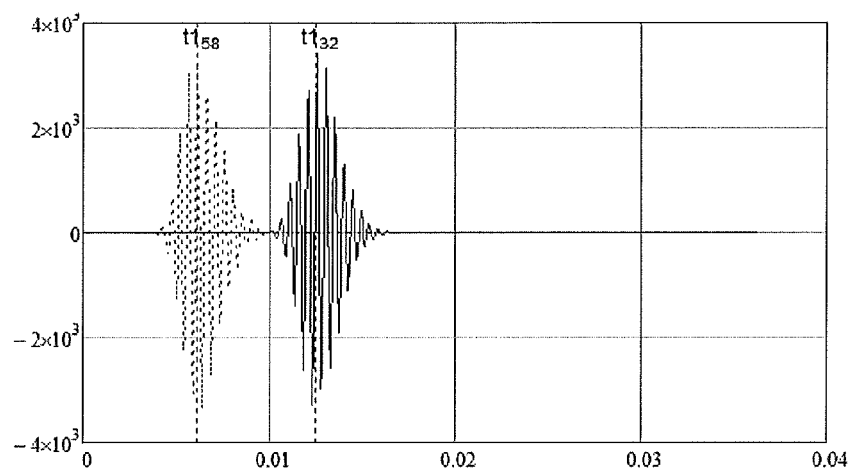
FIG. 11b is an illustration showing the variation in amplitude with time of two tone bursts with a fundamental frequency of 2093 Hz (musical note C0)

FIGS. 11a and 11b show example. Note that the amplitude of the audio signal is less than that of the haptic signal (about ¼ seems satisfactory).

The procedures described above lead to signals that are synchronous in time with the haptic signals, but they should also be synchronous in space. If the same audio signal is fed to each channel, the sound will always appear to emanate from the centre of the panel. To get the sound to track the haptic target, some form of steering will be necessary. For a two-channel system, simple stereo linear amplitude panning would suffice. For more channels, the panning law would be slightly more complicated, but the principle is exactly the same.

By way of example, consider a four-channel system with exciters at, or near, each corner of the panel. If the locations of these are given conceptual co-ordinates of (±1, ±1), we can get the co-ordinates of any point as follows;

$$\xi(x) = \frac{2 \cdot x - x_{max} - x_{min}}{x_{max} - x_{min}}, \eta(y) = \frac{2 \cdot y - y_{max} - y_{min}}{y_{max} - y_{min}}$$

Now define bilinear mapping functions N such that for each exciter there is a function that has unit value at that exciter's location and zero value at all the other exciters' locations.

$$N_i(\xi, \eta) = \frac{1}{4} \cdot (1 \pm \xi) \cdot (1 \pm \eta)$$

Signs chosen appropriately for exciter, i.

The signal strength at exciter i for the target location is then just $$N_i(\xi(x), \eta(y))$$

In other words, the design process of how to take haptic feedback to the user operating a control surface e.g. a screen device, for user entry of data and commands may comprise various steps. The process may start with the aim of simulating a simple mechanical click applied to the surface to make it reactive. Improvements, such as adding frequency and amplitude shading to the non audible tactile impression, may be considered. The operative frequency band/energy control for haptic may also be considered so that power in a useful design band is synthesised such that it has tactile effectiveness in a lower frequency sensory range (see co-pending application GB0905692.0 which is hereincorporated by reference).

Some audible signal content may also be added to reinforce the tactile impression. Improvements may be made to the sound, for example, modelling the associative sound of a good quality switch to help the user better imagine that the essentially non moving haptic surface is moving significantly and with the familiar and reassuring sensation and sound of an expensive push button switch. Frequency synthesis for the switch sounds, frequency band and amplitude envelope may be used to achieve this impression. If necessary, account may be taken of the transmission frequency response of the acoustic transducer system. The system may be conventional or bending wave panel, ideally associated or integral with the haptic screen or surface.

It is also noted that while generalised sound output is useful and widely used, a substantial improvement in perception and user accuracy for input data entry and confidence is proved by the step of adding directionality or location to the sound source. This is achieved by ensuring that the source's radiation location is geometrically on or near the point for user tactile input of data and commands. The value gain is surprisingly substantial.

As set out above, multiple exciters/transducers may be coupled to the touch screen to provide the haptic sensations. The number and locations of these transducers will support the intendedly localised performance of the haptic signals which may be augmented by wave amplitude and phase control of the group of outputs to increase locations discrimination. Haptic signals are generally relatively low in frequency and in context of the device, primarily inaudible or only faintly audible. Thus in a different, higher frequency range, the transducer array, or an alternative transducer arrangement, may direct sound frequency vibration to the surface. The vibration may be radiated by the haptic surface itself for example including bending wave operation, or by multiple miniature sound radiators, even micro speakers. The output and relative phasing of such micro speaker is controlled by suitable input signals and may be used to create useful directional and location sources, real or apparent, which are associated with the location of the data input and the corresponding haptic feedback to the user. In other words, the enhanced, processed sound of the haptic click appears to come from the input/haptic feedback location.

The touch screen may incorporate a visual screen having 'a button' or any other visual control icons indicated thereon. A variety of visual icons from a rotary volume control, to the to the spin wheel of an analogue radio tuners, or the 'thumb stick' (kind of joystick) of games box and similar controllers may be used. Each of these visual control icons may have a whole variety of tactile and sounds signals uniquely associated with them.

Figure 12A:
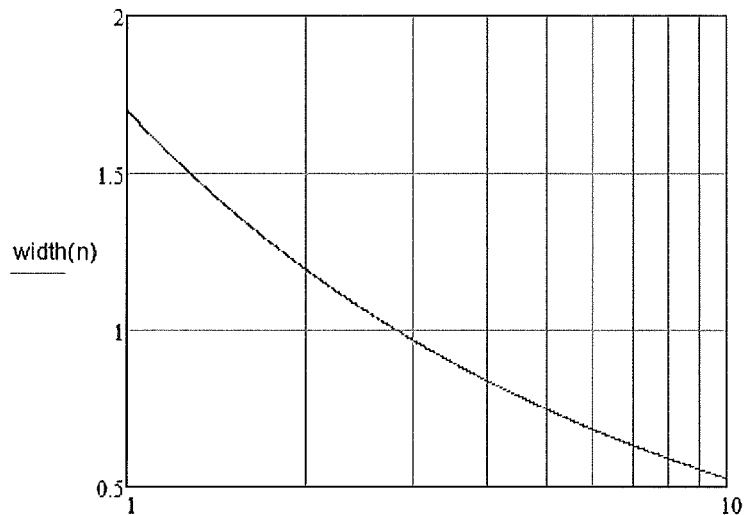
FIG. 12a plots the width of the pulse as it varies with n for the modified envelope function h of FIG. 3, and FIG. 12b plots the normalised cut-off frequency at it varies with n.

FIG. 12a shows the pulse width variation in n for the "single bump" function, h defined above. Its derivatives are:

$$h'(\alpha \cdot t, n) = n \cdot (1 - \alpha \cdot t) \cdot (\alpha \cdot t)^{n-1} \cdot \exp(n \cdot (1 - \alpha \cdot t))$$

$$h''(\alpha \cdot t, n) = n \cdot (n \cdot (1 - \alpha \cdot t)^2 - 1) \cdot (\alpha \cdot t)^{n-2} \cdot \exp(n \cdot (1 - \alpha \cdot t))$$

where $$h''(\alpha \cdot t, n) = \frac{d'' h(\alpha \cdot t, n)}{d''(\alpha \cdot t)} = \frac{d'' h}{\alpha'' \cdot d'' t}$$

There is a curve maximum at h'($\alpha$t,n)=0, i.e.

$$(1 \cdot \alpha \cdot t) = 0, \alpha \cdot t = 1, h(1, n) = 1$$

There are slope stationary values at h''($\alpha$t,n)=0

$$n \cdot (1 - \alpha \cdot t)^2 - 1 = 0, \alpha \cdot t = 1 \pm \frac{1}{\sqrt{n}},$$

$$h'\left(1 \pm \frac{1}{\sqrt{n}}, n\right) = \mp \frac{n}{\sqrt{n} \mp 1} \cdot e^{\mp \sqrt{n}} \cdot \left(1 \pm \frac{1}{\sqrt{n}}\right)$$

The variation shown in FIG. 12a may be described as:

To 1%, width=1.692−1.840·log$_{10}$(n)+0.683·log$_{10}$(n)$^2$

To 0.1%, width=1.6970−1.9966·log$_{10}$(n)+1.1129·log$_{10}$(n)$^2$−0.28643·log$_{10}$(n)$^3$ Additional relevant equations are shown below:

A.1.3. The Integral and Laplace Transform $$H(s, n) = \int_0^\infty h(\alpha \cdot t, n) \cdot e^{-st} dt = \frac{\Gamma(n+1)}{\alpha} \cdot \left(\frac{\alpha}{s + n \cdot \alpha}\right)^{n+1}$$

$$\int_0^\infty h(\alpha \cdot t, n) d\alpha t = \alpha \cdot \int_0^\infty h(\alpha \cdot t, n) dt = \alpha \cdot H_\alpha(0, n) = \frac{\Gamma(n+1)}{n^{n+1}}$$

$$H(s, \alpha, n) = H_\alpha(0, n) \cdot H(s/\alpha, n) = H_\alpha(0, n) \cdot \left(\frac{1}{\frac{1}{n} \cdot \frac{s}{\alpha} + 1}\right)^{n+1}$$

-continued $$\lim_{n \to \infty} \left(\frac{1}{\frac{1}{n} \cdot \frac{s}{\alpha} + 1}\right)^{n+1} = \exp(-s/\alpha)$$

A.1.4 Spectrum Cut-Off Frequency $$\left|\left(\frac{1}{\frac{1}{n} \cdot \frac{s}{\alpha} + 1}\right)^{n+1}\right|^2 = \left(\frac{1}{1 - \left(\frac{1}{n} \cdot \frac{\omega}{\alpha}\right)^2}\right)^{n+1} = \frac{1}{2},$$

$$\omega_c = \alpha \cdot n \cdot \sqrt{2^{\frac{1}{n+1}} - 1} \to \alpha \cdot \sqrt{n \cdot \ln(2)}$$

The "double bump" function f is also described above in relation to the simulation of a switch. Its derivatives are:

$$f'(\alpha \cdot t, n, r) = h'(\alpha \cdot t, n) + \frac{1}{r} \cdot h'\left(\frac{\alpha \cdot t}{r}, n\right)$$

$$f''(\alpha \cdot t, n, r) = h''(\alpha \cdot t, n) + \frac{1}{r^2} \cdot h''\left(\frac{\alpha \cdot t}{r}, n\right)$$

The integral and Laplace functions are shown below:

$$F(s, n, r) = \int_0^\infty \left(h(\alpha \cdot t, n) + h\left(\frac{\alpha}{r} \cdot t, n\right)\right) \cdot e^{-st} dt =$$

$$H_\alpha(0, n) \cdot \left(\left(\frac{1}{\frac{1}{n} \cdot \frac{s}{\alpha} + 1}\right)^{n+1} + r \cdot \left(\frac{1}{\frac{r}{n} \cdot \frac{s}{\alpha} + 1}\right)^{n+1}\right)$$

$$F(s/\alpha, n, r) = (1 + r) \cdot H_\alpha(0, n) \cdot \frac{H(s/\alpha, n) + r \cdot H(r \cdot s/\alpha, n)}{1 + r}$$

$$\int_0^\infty f(\alpha \cdot t, n, r) d\alpha t =$$

$$\alpha \cdot \int_0^\infty f(\alpha \cdot t, n, r) dt = \alpha \cdot (1 + r) \cdot H_\alpha(0, n) = (1 + r) \cdot \frac{\Gamma(n+1)}{n^{n+1}}$$

The spectrum cut-off frequency is more complicated than for the "single bump" function, but if we assume r and n are "reasonably" large, then the primary cut-off will be not much different from that of the single pulse, i.e.

$$\omega_c \approx \alpha \cdot n \cdot \sqrt{2^{\frac{1}{n+1}} - 1}$$

Figure 12B:
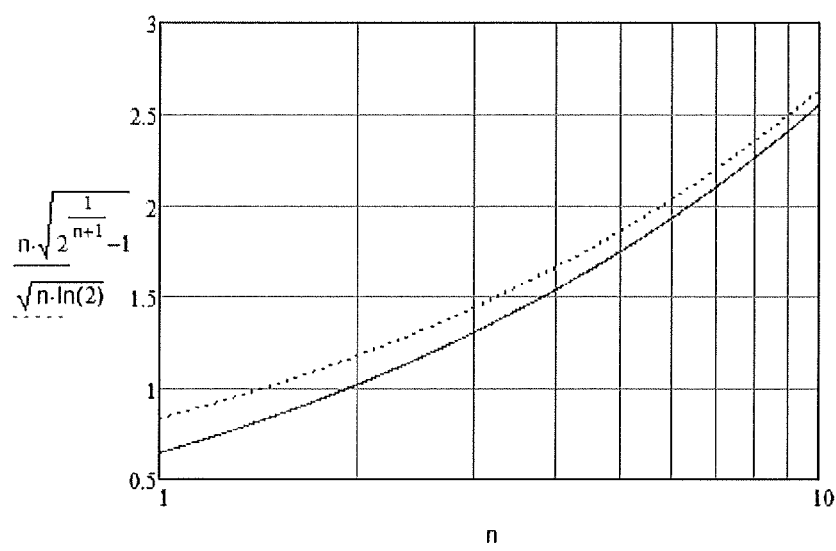

The spectrum cut-off frequencies for both the "single bump" function and the "double bump" function are plotted in FIG. 12b.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of generating a keyboard switch haptic sensation in a coupled system comprising a touch-sensitive surface and a force exciter or actuator coupled to the touch-sensitive surface, the method comprising
    generating a carrier wave signal at frequencies within the frequency bandwidth of the coupled system, modulating the carrier wave signal with a modulation envelope so that the modulated carrier wave signal has a closely spaced pair of peaks comprising a first peak and a second peak, and driving the exciter or actuator with the modulated carrier wave signal to excite the touch-sensitive surface to provide a closely spaced pair of pulses whereby the keyboard switch haptic sensation is simulated to a user touching the touch-sensitive surface, wherein the modulation envelope comprises a sum of two exponential functions having different decay rates so that the modulated carrier wave signal has the closely spaced pair of peaks.

2. The method of claim 1, wherein the pair of pulses have peaks spaced apart by a time interval of the order of 10 to 40 ms.

3. The method of claim 1, wherein the pair of pulses have peaks spaced apart by a time interval of the order of 15 to 30 ms.

4. The method of claim 1, wherein the pair of pulses have peaks spaced apart by a time interval of the order of 22 to 26 ms.

5. The method of claim 1, wherein the second peak has a width of between three to four times the width of the first peak.

6. The method of claim 1, wherein the modulated carrier wave signal has a duration in the region of 100 ms.

7. The method of claim 1, comprising driving an exciter or actuator with an audio signal substantially synchronous in time with the signal that produces the haptic sensation.

8. The method of claim 7, wherein the audio signal has an acoustic signature having a substantially $\frac{1}{3}^{rd}$ octave bandwidth.

9. The method of claim 7, wherein the audio signal has a frequency substantially in the range 800 Hz to 4 kHz.

10. The method of claim 7, comprising localizing the audio signal on the touch sensitive surface to the region touched by the user.

11. The method of claim 10, comprising steering the audio signal using linear amplitude panning.

12. The method of claim 10, comprising steering the audio signal using frequency modulation.

13. The method of claim 7, comprising simultaneously steering audio signals to different regions of the touch sensitive surface.

14. The method of claim 7, comprising simultaneously steering audio signals from a plurality of force exciters or actuators.

15. The method of claim 12, comprising arranging the touch sensitive surface to form part of a member having bending modes in the frequency bandwidth of the coupled system, and taking the bending modes into account in designing the acoustic result of amplitude and/or phase shaping.

16. The method of claim 7, wherein the exciter or actuator driven with the audio signal is the same exciter or actuator driven with the modulated carrier wave signal to generate the haptic sensation.

17. The method of claim 16, wherein the signal has both an audio component and a low frequency component for simulating the haptic sensation.

18. The method of claim 1, wherein each exponential function is a function of a factor n which is dependent on the ratio r between the different decay rates.

19. The method of claim 18, wherein each exponential function is a function of the same factor n.

20. The method of claim 18, comprising determining a critical value of the or each factor n at which the modulated carrier wave signal has the closely spaced pair of peaks and setting the value n to be above this critical value.

21. The method of claim 20, comprising determining a second value of the or each factor n at which the modulated carrier wave signal has a closely spaced pair of peaks with a local minimum between the peaks to be above a determined amount and setting the value n to be above this second value.

22. The method of claim 1, comprising modulating the carrier wave signal with a modulation envelope defined as:

$$h(\alpha \cdot t, n_1, n_2) = (\alpha \cdot t)^{n_1} e^{(n_1 \cdot (1-\alpha \cdot t))} + (\beta \cdot t)^{n_2} e^{(n_2 \cdot (1-\beta \cdot t))}$$

where $\alpha$ and $\beta$ are the decay rates of each exponential function, t is time, $n_1$ and $n_2$ are the factors dependent on r with $r = \alpha/\beta$.

23. A touch sensitive device comprising
a touch-sensitive surface,
a force exciter coupled to the touch-sensitive surface to excite vibration in the surface in response to a signal sent to the exciter, with the touch-sensitive surface and exciter together forming a coupled system, and
a signal generator to generate the signal, with the signal generator generating a carrier wave signal at frequencies within the frequency bandwidth of the coupled system and modulating the carrier wave signal with a modulation envelope so that the modulated carrier wave signal has a closely spaced pair of peaks whereby a user touching the touch-sensitive surface excited by the exciter in response to the modulated carrier wave signal experiences a keyboard switch haptic sensation,
wherein the modulation envelope comprises a sum of two exponential functions having different decay rates so that the modulated carrier wave signal has the closely spaced pair of peaks.

* * * * *